Figure 1:
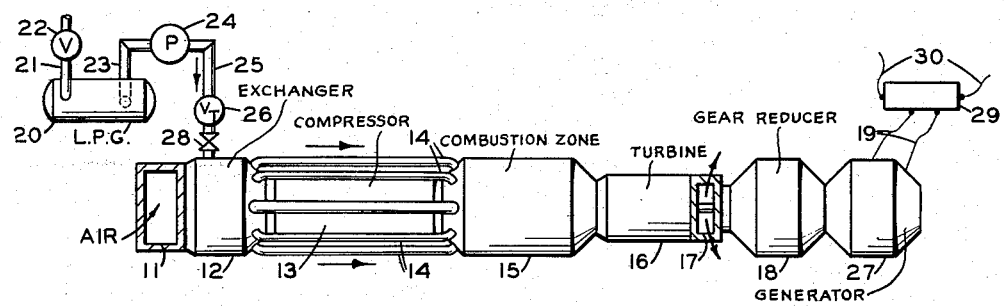

Sept. 27, 1955     O. C. BRIDGEMAN     2,718,753
IMPROVED OPERATING OF INTERNAL COMBUSTION ENGINE
OPERATING ON LIQUID PETROLEUM GAS FUEL
Filed Jan. 2, 1951

INVENTOR.
O. C. BRIDGEMAN

BY Hudson & Young

ATTORNEYS

United States Patent Office 2,718,753
Patented Sept. 27, 1955

2,718,753

IMPROVED OPERATION OF INTERNAL COMBUSTION ENGINE OPERATING ON LIQUID PETROLEUM GAS FUEL

Oscar C. Bridgeman, Bartlesville, Okla., assignor to Phillips Petroleum Company, a corporation of Delaware Application January 2, 1951, Serial No. 204,004

2 Claims. (Cl. 60—39.02)

This invention relates to internal combustion engine system operation. In one aspect it relates to the operation of internal combustion engine systems in which air is compressed prior to supporting combustion of volatile hydrocarbon fuel in the combustion chamber of the engine.

As exemplary of the principle set forth according to my invention, I will explain my invention as applied to gas turbine operation. It is to be understood, however, that my invention as applicable generally to internal combustion engine systems in which air is compressed prior to introduction into the combustion chamber.

The gas turbine as a prime mover is not a new development, although its application up to the present time has been rather limited. Recent improvements in design and materials of construction have broadened the field of application, however, and the gas turbine has in the last few years enjoyed a rapidly expanding acceptance. Diesel and aircraft engine superchargers, air compressors, and locomotives have been powered by gas turbines and these are exemplary of some of the present day applications.

A gas turbine unit is comprised essentially of an air compressor, a fuel injection and combustion section, and the turbine proper. The air compressor, usually a centrifugal or an axial flow type, brings in the supply of the combustion-supporting gas and discharges it to the combustion section, fuel there being added and combustion taking place. The hot gases then pass to the turbine rotors and impart rotational energy to these rotors by directed impingement against the turbine blades.

In practice, the turbine rotor is frequently directly connected through a shaft to the air compressor, and a part of the turbine energy is utilized in driving the compressor and the remainder in doing useful work.

It is obvious that numerous variations are possible in such a system. For example, in a supercharger application, the gas turbine may be driven by exhaust gases from an internal combustion engine and the compressed air supplied to that engine. In a locomotive or stationary installation, the power generated in the turbine over that required by the air compressor is available to drive the locomotive or to perform other useful work as desired. In each of these applications, however, a portion of the energy produced within the system is used by the air compressor to compress the air supplied to the power generating portion of the apparatus.

It is seen from the foregoing discussion that increasing the efficiency of the air compression step and/or increasing the capacity of the air compressor without substantially increasing the mechanical complexity of the apparatus is highly desirable. An increase in the efficiency of the air compression unit results in less energy consumed there and further results in a greater power output for a given total power generated by the power producing portion. In another situation, increasing the capacity of the compressor in a given apparatus results in enabling this apparatus to provide a greater power output, a feature of great value in meeting peak load demands.

This invention is applied to applications for cooling or in other words for increasing the density of the air used for supporting combustion of the fuel. By increasing the density of the air through this cooling a greater mass of air per unit of volume is taken into the compressor or supercharger and accordingly the output of the compressor is increased. By so increasing the air density more compressed oxygen is available for combustion of more fuel, hence a greater power output is available than when the density of the air is not so increased. While the operation of a gas turbine is explained in detail, it is to be understood that my invention as applied to a gas turbine is given merely as an example of the principle involved. The air for combustion may be so advantageously cooled for use in diesel type engines, in spark ignition type engines as well as in other types of power or thrust generating devices.

The fuels applicable for use according to my invention include the liquefied normally gaseous hydrocarbons such as methane, ethane, ethylene and propylene as well as propane and butane and some higher boiling hydrocarbons.

By the term "expansion" as used herein applicant means expansion or increase in volume upon change in phase of the liquefied fuel to gaseous fuel as well as by mere expansion of vaporous fuel from one pressure to a lower pressure. Most of the cooling obtained herein for indirect heat exchange with combustion air is obtained from the latent heat of evaporation of the liquid fuel.

It is known that gas turbines are capable of yielding higher power outputs as the intake air temperature are decreased. For example, a Brown-Boveri gas turbine locomotive producing 1700 H. P. with intake air at 100° F. produced 2200 H. P. with 68° F. intake air. At minus 5° F., the power output of the locomotive was further increased to 3000 H. P. The degree of variation of power output with intake air temperature will not necessarily be the same for other installations, but this variation will be of the same general order of magnitude and is always in the same direction.

I have devised a method whereby a particular class of fuel for gas turbines is advantageously used to cool the air being compressed, thus effecting economy of operation and/or increasing the maximum power output of the turbine. These fuels are the hydrocarbons having three and four carbon atoms per molecule, and may be used as substantially pure material, or as a mixture of two or more of these components. Since the individual components vary in vapor pressure quite substantially, one specific embodiment of this invention may utilize one particular hydrocarbon compound or mixture to a greater advantage than some other specific embodiment.

This class of fuels is comprise of such hydrocarbons as propane, propylene, normal butane, isobutane, and the butylenes. The use of the hydrocarbon, butadiene, is not to be excluded. In practice, the method of operation consists of cooling the air, prior to completion of the compression step by the compressor, with indirect heat exchange with this high vapor pressure fuel during its vaporization, thus utilizing the latent heat of vaporization to reduce the temperature of the air during compression. By cooling the air as described, the energy input to the compressor is lowered and/or a maximum capacity of the compressor is increased. The cooling may be carried out prior to the entry of the air into the compressor, it may be intercooling between stages of compression, or it may be a combination of these. The use of extraneous cooling to supplement the cooling from the latent heat of evaporation of the liquefied fuels is intended to be included herein.

Such higher boiling hydrocarbons than the above mentioned $C_4$ hydrocarbons can be used according to my process if they are sufficiently volatile to vaporize at the air compressor stage inlet temperature and combustor pressure to such a degree as to provide appreciable cooling of the air prior to at least a part of the compression. These higher boiling hydrocarbons should preferably boil below 225° F. but hydrocarbons boiling higher than this temperature can be used; however, the operable advantage of my process diminishes as the boiling point of the fuel increases above 225° F.

An object of my invention is to devise a method for improving the efficiency of a gas turbine operation.

Another object of my invention is to devise a method for utilizing liquefied petroleum gases in an efficient manner as gas turbine fuel.

Still another object of my invention is to devise apparatus and a method for utilizing relatively inexpensive liquefied petroleum gases as fuel for the operation of gas turbines.

Yet another object of my invention is to devise apparatus and a method for utilizing relatively inexpensive liquefied petroleum gases as fuel for the operation of internal combustion engine systems.

Still other objects and advantages of my invention will be realized upon reading the following disclosure which, taken with the attached drawing, forms a part of this specification.

Figure 2:
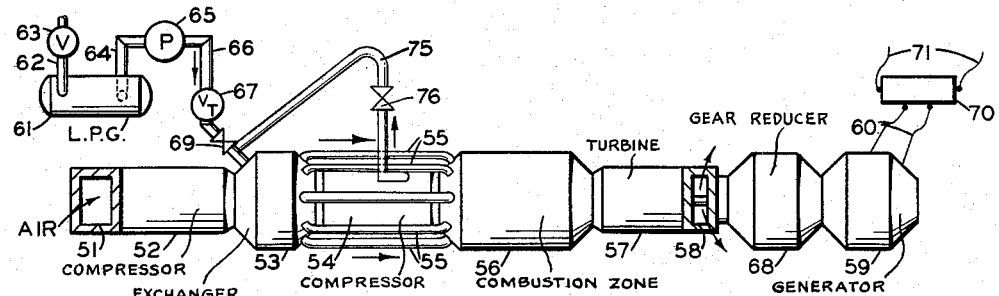
Figure 3:
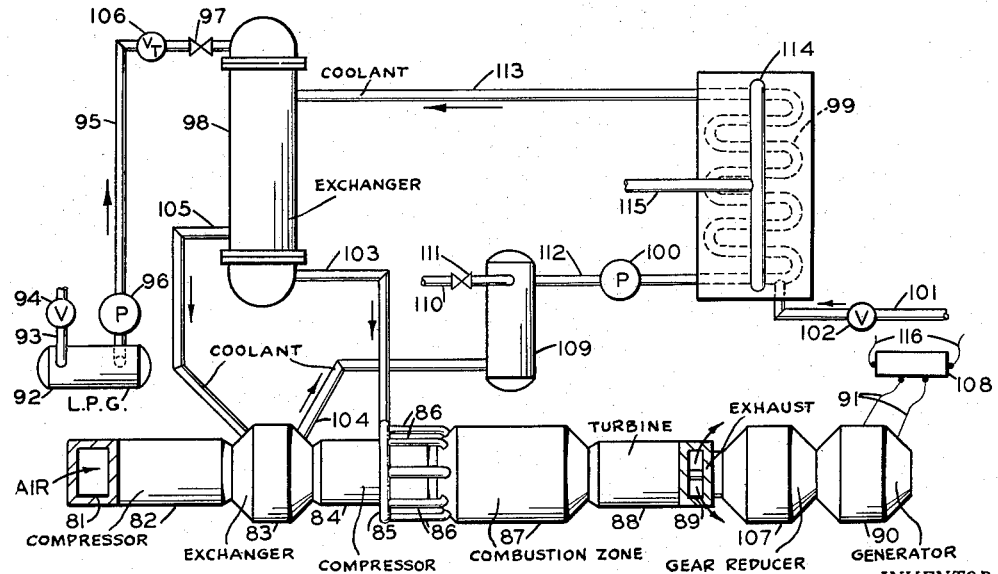

In the drawing, Figure 1 illustrates a plan view of one arrangement of apparatus parts for efficiently utilizing liquefied petroleum gases as gas turbine fuel. Figure 2 illustrates a plan view of a second embodiment of apparatus in which to practice the method of my invention. Figure 3 is a plan view of still another embodiment of apparatus parts in which to practice the method of my invention.

Referring now to the drawing and specifically to Figure 1, reference numeral 11 represents the air inlet or intake to a gas turbine assembly. Air from this inlet 11 flows through an exchanger 12 into a compressor 13 in which the air is compressed, for example, to between three and fifteen atmospheres of pressure or more. The air then flows into a combustion section 15 in which the air is mixed with the combustible fuel and combustion takes place. The hot combustion gases leave the combustion section 15 and flow into a turbine 16 and leave the turbine through an outlet 17. A liquefied petroleum gas, such as propane, is stored in a storage tank 20. This liquid fuel flows from the tank 20 through some pipes 23 and 25 under the influence of a pump 24. The liquid fuel is passed through a throttle rate valve 26 and vaporization occurs after passing through valve 28. The liquid fuel passes into the exchanger 12 and vaporous fuel leaves by way of some pipes 14. During the vaporization of the liquid fuel in the tubes of exchanger 12, the latent heat of vaporization is used in cooling the air passing from the air inlet 11 through spaces between the tubes of the exchanger 12. This inlet air is then cooled by an amount equivalent to the latent heat of vaporization of the liquefied gas. The warm vaporous fuel passes on through tubes 14 into the combustion section 15 in which this fuel is mixed with the cooled air entering this section from the compressor 13. This air is termed cooled air since its temperature is lower than the compressor outlet air would have been if the heat exchange operation had not taken place in the exchanger 12. Thus, by cooling the air charged to the compressor 13 more air is taken into the compressor and, of course, more air is discharged from the compressor and, accordingly, the capacity for the power output from the turbine is increased. The hot gases of combustion then leave the combustion section 15 and pass through the turbine 16 in which these gases rotate the turbine rotors by impingement against them. The gases of combustion exhaust from the turbine 16 through the exhaust gas outlet 17. The turbine shaft may be connected directly through a gear reduction assembly 18 to an electric generator 27. Lead wires 19 are shown leading from the electrical generator 27 to an electrical panel board 29 from which electricity may be taken off for various uses, as through wires 30. A pipe 21 containing a valve 22 is for inlet of liquefied petroleum gas fuel to the storage tank 20.

In the apparatus embodiment illustrated in Figure 1 wherein the latent heat of vaporization of the liquefied gas is used to cool the inlet air to the compressor, any liquefied hydrocarbon or gases, one or a mixture of normally liquid hydrocarbons, or mixtures thereof can be used as fuel provided the vapor pressure of the fuel is sufficiently high that the liquid can be vaporized at the temperature of the last compressor stage air inlet and under the pressure of the last compressor stage air outlet. This holds for compression by one or more stages. When the air is compressed to six atmospheres or about 90 pounds per square inch a pressure obtained in the combustion section 15 will be somewhat higher than this 90 pounds per square inch. Accordingly, the vapor pressure of the hydrocarbon gas at its temperature of inlet into the combustion section should be sufficiently high that it will inject itself into the combustion section against the pressure maintained therein. Thus, by selecting the liquefied fuel of proper vapor pressure, a fuel injection pump or pumps need not be used.

The pressure on the downstream side of the expansion valves is lower than on the upstream side since the liquefied petroleum gas fuel is pumped under pressure by pump 24 (Fig. 1) to valves 26 and 28. Upon passage of the liquefied fuel through these valves, it flows on through the exchanger 12 and tubes 14 into the combustion zone 15 and thence through the engine 16 to exhaust 17. Thus, after the fuel passes valves 26 and 28 it has substantially free flow through the remaining apparatus parts to exhaust. The combustion gases, of course, do useful work on passage through the engine 16, irrespective of the type of engine.

In such an apparatus as illustrated in Figure 1, the B. t. u. of cooling obtained from the vaporization of the liquefied fuel is sufficient to cool the air passing through the exchanger to an extent of about 12° F. This degree of cooling is obtained when the air is passed through the exchanger in an amount to give theoretically complete combustion of the liquefied petroleum gas.

As an example of the increased maximum power output realized in a gas turbine assembly is developing 1700 H. P. with the normal air inlet temperature of 100° F. the H. P. output of the turbine is increased to about 1900 H. P. when the air inlet temperature is decreased 12° F. from the cooling available by vaporization of the liquefied petroleum gas fuel.

In Figure 2 of the drawing most of the apparatus parts are similar to those illustrated in Figure 1. The main difference of the apparatus of Figure 2 from that of Figure 1 is that two air compressor sections are used. Atmospheric air passes through an inlet 51 into the suction side of a compressor section 52. Compressed air from this unit passes through an indirect heat exchanger 53 and thence into the suction side of a second compressor unit 54. Fully compressed air is discharged from this compressor unit 54 into a combustion section 56 of a turbine assembly.

Liquefied petroleum gas from a storage tank 61 is passed through a line 64 under the influence of a pump 65. This liquid fuel is passed on through a pipe 66 and through a throttle valve 67 and an expansion valve 69. On passing through this expansion valve 69 the pressure drop is sufficient that the liquefied fuel vaporizes. This vaporizing fuel passes through the tubes in an indirect heat exchanger 53 and in indirect contact with the compressed air from the compressor section 52. By this heat exchange, the compressed air is cooled somewhat and the vaporized fuel gas is warmed. The cooled air is taken into the second compressor section 54 and compression is completed therein to a pressure of about six atmospheres. Under this pressure, the compressed air is injected into a combustion section 56 along with the vaporized and warmed fuel gas from tubes 55 from the exchanger 53. In the combustion section 56 mixing of the fuel gas and combustion-supporting gas occurs, combustion takes place and the hot combustion gases pass into a turbine 57. The spent combustion gases from the turbine are exhausted through an exhaust gas outlet 58 for such disposal as desired. The high speed of rotation of the turbine shaft is reduced by a gear reduction assembly 68. An electrical generator 69 is illustrated as attached to the power outlet side of the gear reduction assembly. Some lead wires 60 transmit electrical energy from the generator 59 to a panel board 70 from which electrical power may be taken off through some lines 71 for any use desired.

Pipe 62 containing valve 63 is for the inlet of liquefied petroleum gas to the storage tank 61.

In Figure 2, the pressure on the downstream side of valves 67 and 69 may be only slightly lower than the pressure upstream of valve 67 since the liquefied fuel is evaporated by the hot compressed air from compressor 52. The latent heat of this vaporization is consumed in intercooling the air between the compression stages.

The liquefied petroleum gas which can be used as fuel in the apparatus assembly illustrated in Figure 2 may be either of the butanes, butenes, or other $C_4$ hydrocarbons, or the $C_3$ hydrocarbons. For example, butane which has a relatively low vapor pressure may be used alone as fuel in this embodiment. Butane may be used herein since the temperature of the compressed air from the first stage compressor 52 is sufficiently high to evaporate butane and to maintain this vaporized butane at a sufficiently high pressure that it will be self-injecting through pipe 65 into the combustion section 56 against the pressure maintained therein. Of course, propane or propylene may also be used in the apparatus embodiment of Figure 2 since the vapor pressures of these hydrocarbons are higher than the vapor pressure of butane. Mixtures of any of the butanes or two or more of them with propane or propylene, or both, may similarly be used as the fuel in this apparatus embodiment of Figure 2.

In the apparatus embodiment of Figure 3 provision is made for supplementary cooling to the cooling obtained by the normal evaporation of the liquefied petroleum gas fuels so that efficiency in power output of gas turbine units may be further increased. In this embodiment the actual turbine parts are similar for the most part of those illustrated in the embodiment of Figure 2. Air for supporting combustion of the fuel is taken into a first stage compressor 82 through an air inlet 81. The compressed air is discharged into an exchanger 83 from which the air passes into a second compressor 84. The fully compressed air is then introduced into a combustion section 87 in which the air is mixed with the fuel gas from some pipes 86. The fuel is burned in the combustion section 87 and the combustion gases are passed into a turbine section 88 in which the energy is then transferred from the combustion gases to the rotating turbine blades. Exhaust gases from the turbine leave this unit through an exhaust gas outlet 89. A turbine shaft is connected directly to one side of a gear reduction apparatus. The slow speed side of gear reduction apparatus is connected to an electrical generator 90 for generation of electric power. From this generator 90 pass some electrical lead wires 91 to a panel board 108. From this board electrical power for various purposes may be taken, as by some wires 116.

Liquefied petroleum gas fuel is taken from a storage tank 92 through a pipe 95 and is transferred under the influence of a pump 96 through a throttle valve 106 and through an expansion valve 97. On passing through this expansion valve 97 the liquefied fuel experiences a reduction in pressure and vaporization takes place. The evaporated or partly evaporated liquefied fuel passes from the expansion valve 97 into the tube section of an indirect heat exchanger 98. In this exchanger 98 the liquefied fuel becomes fully and completely vaporized giving up its heat of vaporization to a coolant flowing through the exchanger between the pipes. Such a coolant may be water, for example. Thus, the water from a pipe 113 enters the exchanger 98 and leaves this exchanger through a pipe 105. In passing through this exchanger the water becomes somewhat cooled due to its giving up of heat to the evaporating liquefied petroleum gas fuel. The cooled water then flows on through pipe 105 into the tube section of an exchanger 83. The compressed air discharging from the first compressor 82 is cooled to any desired extent by indirect heat exchange with the water flowing through the tubes of the exchanger 83. The water exists from this exchanger through a pipe 104, while the cooled compressed air enters the suction side of a second compressor unit 84 for further compression. This second compressor stage completes the compression of the air to a pressure desired for introduction of the air into the combustion zone 87.

The water from pipe 104 is passed into a run tank 109. From this tank the water is taken through a pipe 112 and pumped by a pump 100 through some coils 99 for additional cooling. Sufficient cooling may be obtained in the cooler 99 by heat exchange with the atmosphere under such conditions when the atmosphere is at a sufficiently low temperature. However, it is preferable to either supplement atmospheric cooling or to replace atmospheric cooling entirely by a water spray or other method of cooling. In such a case water from a source not shown is passed through a pipe 115 into a perforated water spray pipe 114, from this pipe 114 water sprays upon the cooling coils 99. The water so cooled in the coils 99 is passed on through line 113 into the exchanger 98 for additional cooling from the vaporizing liquefied petroleum gas. In this manner the cooling available from the vaporizing liquefied petroleum gas is used to obtain the lowest temperature for the cooling water prior to its introduction into the exchanger 83 for cooling the partially compressed air from the first stage compressor 82. Makeup water as needed for the closed circuit cooling may be introduced into the coil 99 through a pipe 101 containing a valve 102, from a source not shown. Liquefied petroleum gas fuel is introduced into the storage tank 92 through a pipe 93 containing a valve 94, from a source not shown. The coolant water tank 109 may be provided with a pipe 110 fitted with a pressure relief valve 111 in case relief of pressure is required from this tank. A conduit 103 is for passage of the fully vaporized liquefied petroleum gas fuel from the exchanger 98 to the manifold 85 for passage through lines 86 into the combustion section 87. While I have shown and described, for illustrative purposes, the use of water as a coolant in the compressed air exchanger 83 of Figure 3, I do not intend to limit my invention to the use of this coolant. Any other coolant desired may be used. Any other coolant used should, however, be capable of being cooled, preferably in the liquid state, in the exchanger 98 and transferred at a relatively low temperature through pipe 105 into the exchanger 83. This coolant should, of course, be capable of being transferred by a pump. The coolant should further be adapted to be cooled in an inexpensive manner to such temperature that the supplemental cooling obtained by the vaporizing liquefied petroleum gas fuel in exchanger 98 will produce a sufficiently low temperature that a desired and required amount of cooling is available for use in the exchanger 83.

A fuel for use in the apparatus embodiment illustrated in Figure 3 may be propane, propylene, either of the butanes or butenes, or butadienes, or mixtures of any or all of these hydrocarbons. However, the hydrocarbons or mixtures of hydrocarbons used in this case should be so selected that the pressure available in the intake manifold 85 and tubes 86 will be sufficient to force the gaseous fuel into the combustion section 87 against the pressure maintained therein.

The throttle valves 26 of Figure 1, 67 of Figure 2, and 106 of Figure 3 are of the type of valve which is adapted to throttle the flow of liquids therethrough. These throttle valves are the valves by which the feed or operation of the turbine may be controlled. Thus, in the embodiment of Figure 1, the engineer or operator operating such an apparatus upon evidence of increased load of the turbine unit will open somewhat the throttle valve 26 to allow the flow of more fuel through the expansion valve 28, through the exchanger 12, pipes 14 and into the combustion zone or unit 15. Upon the addition of more fuel to this combustion section 15, more combustion gases pass into the turbine 16 and, accordingly, more power is produced by the turbine. Such throttle valves may be arranged so that their operation is effected manually by an operator or they may be provided with automatic controls so that upon increase of load upon the turbine unit the throttle valve will be automatically opened to permit the flow of more fuel. The use of automatically controlled throttle valves is quite satisfactory for such turbine installations, such as for power plants for driving machinery.

When other types of combustion engines are used in the practice of my invention, it is to be understood, then, that the apparatus, as exemplified by Figure 1 of the drawing will consist of a liquefied fuel tank 20, expansion valve 26, exchanger 12, compressor 13 while units 15 and 16 will be the other type engine, as a diesel type engine, or the spark ignition type engine. It is to be further understood that the combustion zone 15, as in Figure 1, may be replaced by a diesel type engine as a combustion zone for the production of combustion gases which may be subsequently injected into such a gas turbine as unit 16.

Such other engines may replace the combustion chamber 56, turbine 57 of Figure 2 and the combustion chamber 87 and turbine 88 of Figure 3 as well as the equivalent units of Figure 1.

When such other power units are used, the combustion in the power unit is not necessarily continuous but may be intermittent.

One embodiment of my invention involves the use of less volatile fuel alone or in admixture with a more volatile fuel. For example, such a fuel may consist of a major portion of propane or butane and a minor portion of such a hydrocarbon as pentane, hexane or even heptane. In a system in which such less volatile hydrocarbons are used in the fuel a portion of the final compressor outlet air and the liquid fuel are mixed and then passed in indirect heat exchange with the inlet air to the last stage of compression in such manner that the vaporizing liquid fuel absorbs heat indirectly from the inlet air prior to its passage into the final stage of compression. In this embodiment, illustrated in Figure 2, a bypass pipe 75, provided with a valve 76, conveys a portion of the compressed air from the outlet end of the second stage compressor 54 to the fuel flowing through pipe 66 between valve 69 and the exchanger 53. In this manner higher boiling fuel than propane or butane can be used. When it is desired not to use this embodiment of bypass compressed air to expedite fuel evaporation, valve 76 may be closed.

Alternatively, the air from the last stage of compression may be passed through a venturi and the resulting local reduction of pressure at the venturi throat outlet utilized in the vaporization of the fuel and in its injection into the compressed air ahead of the combustion step.

For purposes of simplicity many auxiliary apparatus parts have not been shown. Among such auxiliary parts are pressure and temperature indicators, regulators, and/or controllers, and the like. Materials of construction, of course, will be selected from among those commercially available and best adapted to serve the problem at hand under a given set of operation conditions.

The figures and descriptions given hereinabove are for illustrative purposes, and should not be regarded as limiting the invention, the scope of which is set forth in the following claims.

I claim:

1. A method for increasing the power output of a combustion engine using a volatile hydrocarbon liquid fuel comprising the steps of compressing air to a superatmospheric pressure whereby the air is heated, passing this heated compressed air in indirect heat exchange with an admixture of one portion of the further compressed air as subsequently produced and liquid fuel whereby the liquid fuel vaporizes in said further compressed air and absorbs heat indirectly from said heated compressed air thereby cooling same, compressing the cooled compressed air to a higher superatmospheric pressure, dividing this further compressed air into two portions, adding to one portion said liquid fuel to provide the aforesaid admixture, combining the admixture after said indirect heat exchange with the remaining portion of the further compressed air and burning this mixture to produce hot combustion gases, expanding the hot combustion gases to produce work, and exhausting the expanded gases.

2. In a combustion engine system, a first air compressor having an inlet and outlet, an indirect heat exchanger having an inlet and an outlet for air and an inlet and an outlet for engine fuel, the air inlet of said exchanger being connected to the air outlet of said first compressor, a second compressor having an inlet and an outlet, the inlet of said second compressor being connected to the outlet for air of said exchanger, a combustion chamber having an inlet for fuel, an inlet for air, and an outlet for gases of combustion, the inlet for air of said combustion chamber being connected with the outlet of said second compressor, a gas turbine having an inlet and an outlet for power and for exhaust gases respectively, the inlet of said turbine being connected to the combustion chamber outlet, a storage tank for liquefied normally gaseous hydrocarbon fuel, a first conduit leading from said storage tank to the fuel inlet of said exchanger, an expansion valve in said first conduit, a second conduit leading from the fuel outlet of said exchanger to the fuel inlet of said combustion chamber, and a third conduit leading from the outlet of said second compressor to said first conduit intermediate said expansion valve and said heat exchanger to conduct compressed air to the fuel inlet of said exchanger.

References Cited in the file of this patent

UNITED STATES PATENTS

| Number | Name | Date |
|---|---|---|
| 1,052,588 | Janicki | Feb. 11, 1913 |
| 2,186,706 | Martinka | Jan. 9, 1940 |
| 2,322,717 | Nettel | June 22, 1943 |
| 2,375,006 | Larrecq | May 1, 1945 |
| 2,435,557 | Eyre | Feb. 3, 1948 |
| 2,438,247 | Knudsen | Mar. 23, 1948 |
| 2,548,508 | Wolfner | Apr. 10, 1951 |
| 2,602,289 | Anxionnaz et al. | July 8, 1952 |